United States Patent [19]

Takizawa et al.

[11] Patent Number: 5,191,481
[45] Date of Patent: Mar. 2, 1993

[54] LENS INSTALLATION IN AN OPTICAL DEVICE

[75] Inventors: Yasuo Takizawa, Saitam; Shinyu Ikeda, Tokyo; Masataka Nishiyama, Tokyo; Takaaki Yoshinari, Tokyo; Masakuni Suwashita, Tokyo, all of Japan

[73] Assignee: Asahi Kogaku Kogyo Kabushiki Kaisha, Tokyo, Japan

[21] Appl. No.: 757,221

[22] Filed: Sep. 10, 1991

[30] Foreign Application Priority Data

Sep. 17, 1990 [JP] Japan .................. 2-97888[U]

[51] Int. Cl.⁵ .............................................. G02B 7/02
[52] U.S. Cl. ...................................... 359/811; 359/822
[58] Field of Search ............... 359/803, 811, 822, 823, 359/824, 825, 826, 829, 830, 894

[56] References Cited

U.S. PATENT DOCUMENTS

| | | | |
|---|---|---|---|
| 2,612,091 | 9/1952 | Weiss | 359/829 |
| 3,059,534 | 10/1962 | Keznickl | 359/822 |
| 3,751,139 | 8/1973 | Malherbe | 359/822 |
| 4,179,191 | 12/1979 | Freudenschuss | 359/823 |
| 4,298,262 | 11/1981 | Nozawa | 359/825 |
| 4,371,245 | 2/1983 | Iwata | 359/825 |
| 4,582,350 | 4/1986 | Okajima | 359/829 |
| 4,910,544 | 3/1990 | Nomura | 359/825 |
| 4,964,697 | 10/1990 | Fuziwara | 359/894 |
| 5,066,103 | 11/1991 | Kodaka | 359/823 |

Primary Examiner—Eugene R. LaRoche
Assistant Examiner—A. Zarabian
Attorney, Agent, or Firm—Kane, Dalsimer, Sullivan, Kurucz, Levy, Eisele and Richard

[57] ABSTRACT

A lens unit having a hollow holder and a lens member coupled in the hollow holder in which the lens member has an outer surrounding wall portion integrally formed with the lens member, the outer surrounding wall portion extending along an axis of the lens member, and an outer surface of the outer surrounding wall portion being coupled with an inner wall surface of the hollow holder, whereby the lens member can be prevented from falling or rolling when it is installed in the hollow holder.

8 Claims, 2 Drawing Sheets

LENS INSTALLATION IN AN OPTICAL DEVICE

BACKGROUND OF THE INVENTION

The present invention relates to a lens installation in an optical device, and more particularly to a structure for installing a lens in an optical device in such a fashion that the lens is slidable in the direction of its optical axis.

In the prior arts, one of known lens unit of this type is a collimator lens unit employed in a laser beam scanning device.

Usually, the collimator lens unit comprise a cylindrical hollow holder, a lens holding member slidably coupled into the hollow holder, and a lens carried by the holding member.

The lens is seated at the inner surface of a flange formed at the front portion of the holding member by means of a ring member threadably coupled to the inner surface of the holding member, in such a fashion that the optical axis of the lens meets the axial center of the hollow holder.

Thus, by fitting the hollow holder to a main frame of a laser beam scanning device such that the axial center of the hollow holder meets the optical axis of the laser beam scanning device, the lens holding member and therefore the lens itself can slide along the optical axis.

With the above constitution, however, when the lens is assembled into the holding member, there is a tendency that the lens is inclined with respect to the axial center of the holder, which requires trouble-some and time-consuming fine adjustments of the lens disposition.

SUMMARY OF THE INVENTION

It is therefore an object of the present invention to provide an improved lens unit, which can carry the lens slidably in its axial direction, capable of being assembled easily without inclination of the lens.

According to the present invention, there is provided a lens unit comprising a hollow holder and a lens member coupled in the hollow holder in which the lens member has an outer surrounding wall portion integrally formed with the lens member, the outer surrounding wall portion extending along the axis of the lens member, and the outer surface of the outer surrounding wall portion being relatively movably coupled with the inner wall surface of the hollow holder, whereby the lens member can be prevented from falling or rolling when it is installed in the hollow holder.

Optionally, the lens unit can be constituted as the outer wall surface of the outer surrounding wall portion and the inner wall surface of the hollow holder being provided with corresponding screw portions so that the outer surrounding wall portion can be screwed into the hollow holder.

Further, the lens unit may further comprise a light shield coating provided on the inner surface of the outer surrounding wall portion as well as on the inner surface of the hollow holder so that the light shield coating can prevent laser beam from leaking through the outer surrounding wall portion of the lens member and the hollow holder.

The above, and other objects, features and advantages of the present invention will become apparent from the following detail description which is to be read in conjunction with the accompany drawings.

DESCRIPTION OF THE ACCOMPANYING DRAWINGS

DESCRIPTION OF THE EMBODIMENTS

Hereinafter, the embodiments of the present invention are explained in detail by referring to accompanying drawings.

Figure 1:
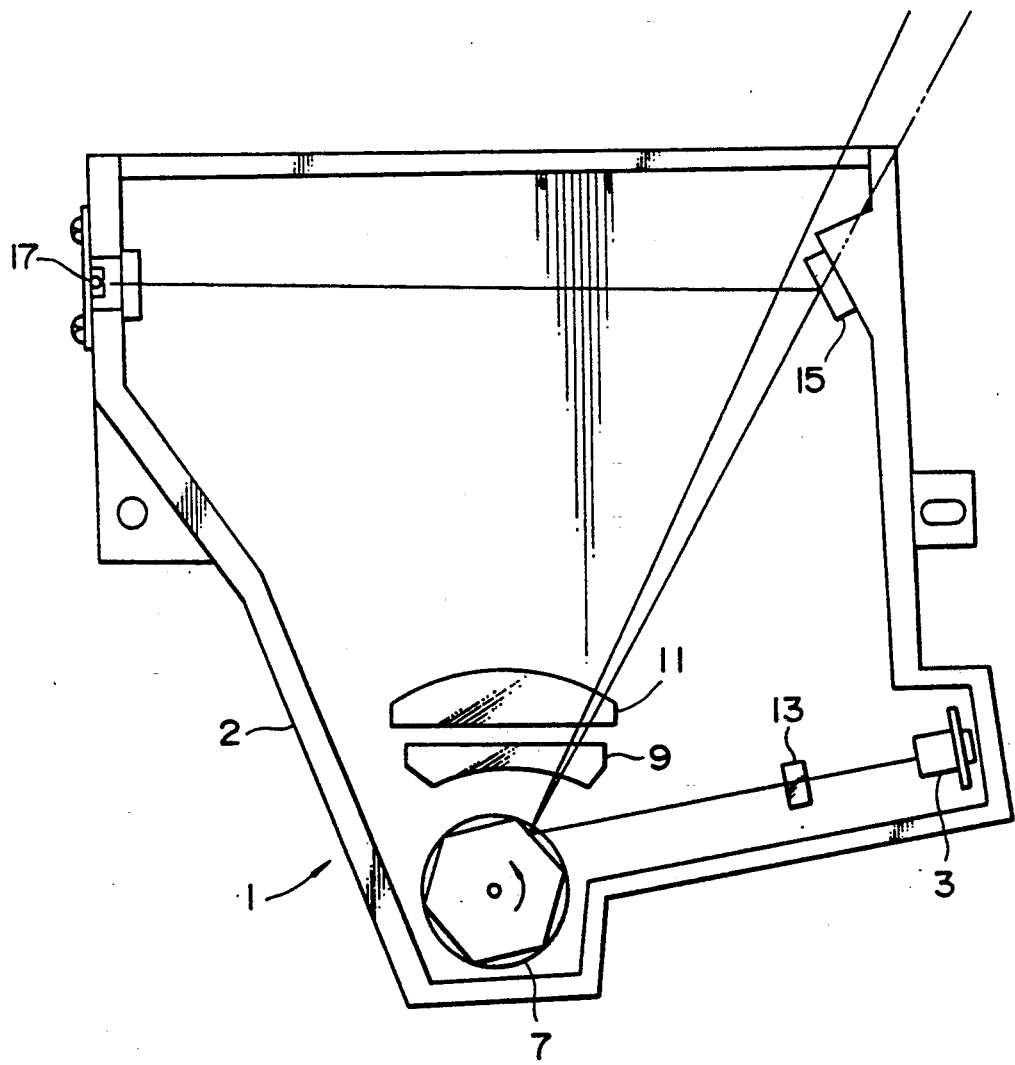
FIG. 1 is a plan view showing a laser beam scanning device employing a lens unit embodying the invention.

FIG. 1 is a plan view showing an essential portion of a laser beam scanning device applied, for example, to a laser printer.

Figure 2:
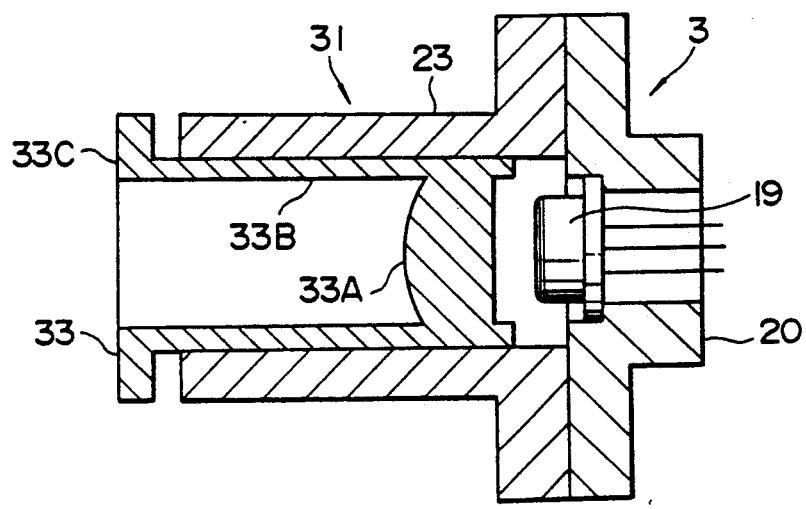
FIG. 2 is a sectional view of the lens unit shown in FIG. 1.

The illustrated laser beam scanning device 1 comprises a housing case 2 and various optical components mounted thereon. The optical components are a laser source 3 for emitting laser beam carrying optical image information, a light deflection means 7 for deflecting the emitted laser beam, an $f\theta$ lenses 9 and 11 for making a scanning speed of the laser beam constant an image-forming surface, a lens 13 for compensating tilt of the light deflection means 7 and so on, a reflecting mirror 15 for reflecting the laser beam, and a horizontal-sync signal generating unit 17 for generating and outputting horizontal-sync signal, which regulates the beam modulation in the laser source 3, when the beam reflected by the reflection mirror 15 incidents. The laser source 3 comprises, as illustrated in FIG. 2, a semiconductor laser 19 which is electrically ON/OFF regulated, and a laser holder 20. The laser holder 20 is connected with a collimator lens unit 31 which modifies the laser light emitted from the semiconductor laser 19 into a parallel flux, i.e., a laser beam.

The collimator lens unit 31 is constituted by a cylindrical hollow holder 23 and a lens member 33. The lens member 33 is made of synthetic resin material. The lens member 33 has a lens portion 33A being formed in a convex configuration, a cylindrical wall portion 33B integrally formed from an outer periphery portion of the lens portion 33A, and a flange portion 33C formed at a free end of the cylindrical wall portion 33B.

The outer wall surface of the cylindrical wall portion 33B is coupled with the inner wall surface of the cylindrical hollow holder 23.

The cylindrical wall portion 33B is formed to extend out of the cylindrical hollow holder 23, and the cylindrical wall portion 33B extends along an optical axis of the lens portion 33A.

The flange portion 33C is provided at the outer end of the cylindrical wall portion 33B for adjusting the axial position of the lens portion 33A.

In accordance with the above arrangement, the collimator lens unit 31 can be installed easily by coupling the cylindrical wall portion 33B of the lens member 33 with the inner surface of the cylindrical hollow holder 23, and also the position of the lens member 33 can be adjusted by simply sliding the flange portion 33C in a back-and-forth direction.

As apparent from the foregoing description, the lens member 33 is free from falling in the cylindrical hollow holder 23 since the cylindrical wall portion 33B and the lens portion 33A are integrally formed.

Figure 3:
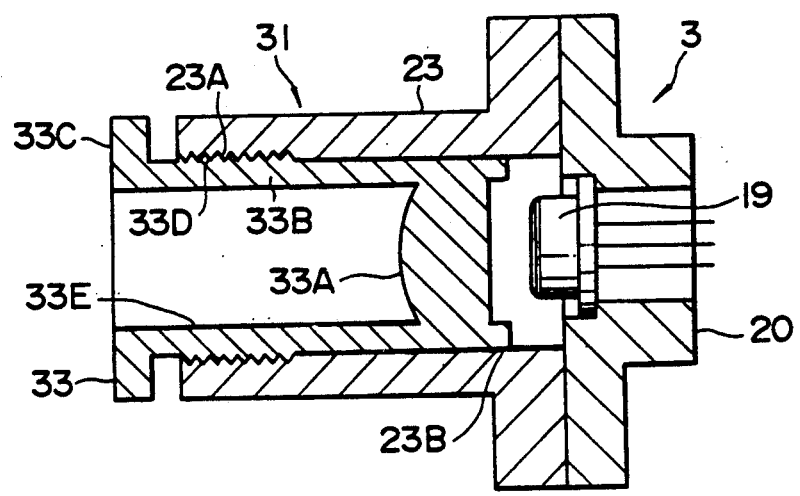
FIG. 3 is a sectional view of the modified lens unit.

FIG. 3 is a sectional view showing a modified lens unit, and the same elements as the first embodiment are suffixed by the same reference numbers as the first embodiment.

In this modification, the outer wall surface of the cylindrical wall portion 33B is provided with a screw portion 33D, and the inner wall surface of the cylindrical hollow holder 23 is provided with a corresponding screw portion 23A. With these screws, the cylindrical wall portion 33 can be threaded into the cylindrical hollow holder 23.

Furthermore, there is provided light shield coating 33E and 23B on the inner surface of the cylindrical wall portion 33B and on the inner surface of the hollow holder 23 except of the lens portions 33A and 23A, respectively. These light shield coatings prevents laser beam from leaking through the cylindrical wall portion 33B or the cylindrical hollow holder 23.

In accordance with the above arrangement, the collimator lens unit 31 can be easily assembled by screwing the cylindrical wall portion 33B of the lens member 33 into the cylindrical hollow holder 23, and also the position of the lens member 33 can be adjusted by simply rotating the flange portion 33C in a clockwise or counterclockwise direction. Furthermore, the laser beam can be prevented from leaking out of the collimator unit 31 even though the lens member 33 and/or the hollow holder 23 are made by semi-transparent material.

As this invention may be embodied in several forms without departing from the spirit of essential characteristics thereof, the present embodiment is therefore illustrative and not restrictive, since the scope of the invention is defined by the appending claims rather than by the description preceding them, and all changes that fall within meets and bounds of the claims, or equivalence of such meets and bounds are therefore intended to embraced by the claims.

The present disclosure relates to subject matter contained in Japanese Utility Model Application No. HEI 2-97888 filed on Sep. 17, 1990, which is expressly incorporated herein by reference in its entirety.

What is claimed is:

1. A lens unit comprising a hollow holder and a lens member coupled in the hollow holder in which the lens member has a lens portion and an outer surrounding wall portion integrally formed with the lens portion, the outer surrounding wall portion extending along the axis of the lens member, and the outer surface of the outer surrounding wall portion being relatively movably coupled with the inner wall surface of the hollow holder, whereby the lens member can be prevented from falling or rolling when it is installed in the hollow holder.

2. The lens unit according to claim 1, wherein said lens member is made of synthetic resin material.

3. The lens unit according to claim 1, wherein said lens portion is formed in a convex configuration.

4. The lens unit according to claim 1, wherein the outer surrounding wall portion of said lens member is formed to extend out of the hollow holder, and has a flange portion formed at a free end of the outer surrounding wall portion.

5. The lens unit according to claim 1, wherein the outer wall surface of the outer surrounding wall portion and the inner wall surface of the hollow holder are provided with corresponding screw portions so that the outer surrounding wall portion can be screwed into the hollow holder.

6. The lens unit according to claim 1, which further comprises a light shield coating provided on the inner surface of the outer surrounding wall portion so that the light shield coating can prevent laser beam from leaking through the outer surrounding wall portion.

7. The lens unit according to claim 6, which further comprises a light shield coating provided on the inner surface of the hollow holder so that the light shield coating can prevent laser beam from leaking through the outer surrounding wall portion of the lens member and the hollow holder.

8. The lens unit according to claim 1, where said lens member comprises a collimator lens.

* * * * *